(No Model.) 2 Sheets—Sheet 1.
W. C. THOMPSON.
COTTON SCRAPER AND CULTIVATOR.
No. 290,814. Patented Dec. 25, 1883.
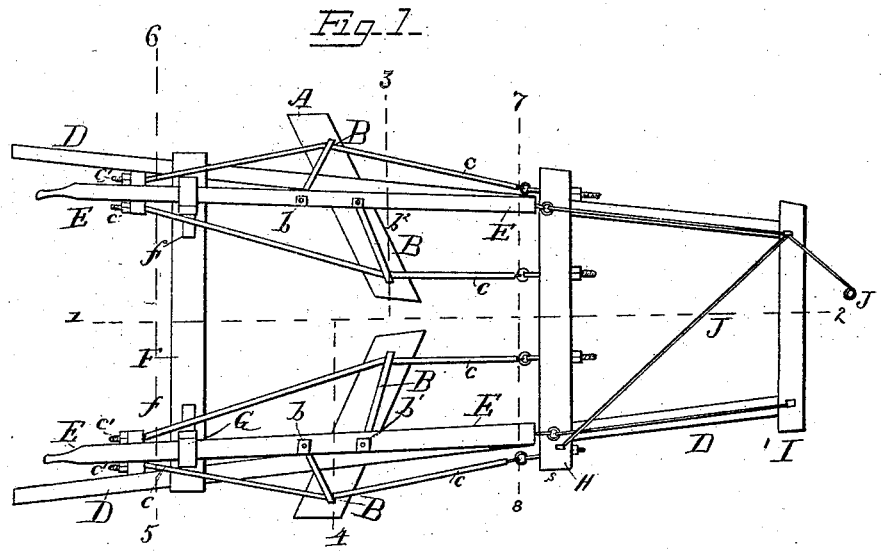
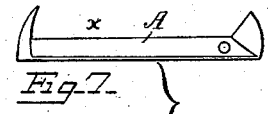
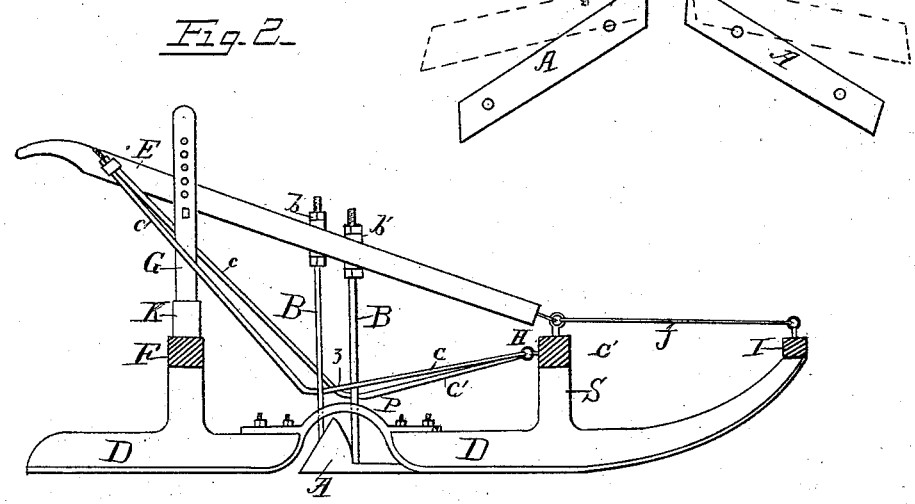
Witnesses
Inventor
W. C. Thompson
By J. N. Macdonald
Asso. Atty.

(No Model.) 2 Sheets—Sheet 2.
W. C. THOMPSON.
COTTON SCRAPER AND CULTIVATOR.
No. 290,814. Patented Dec. 25, 1883.
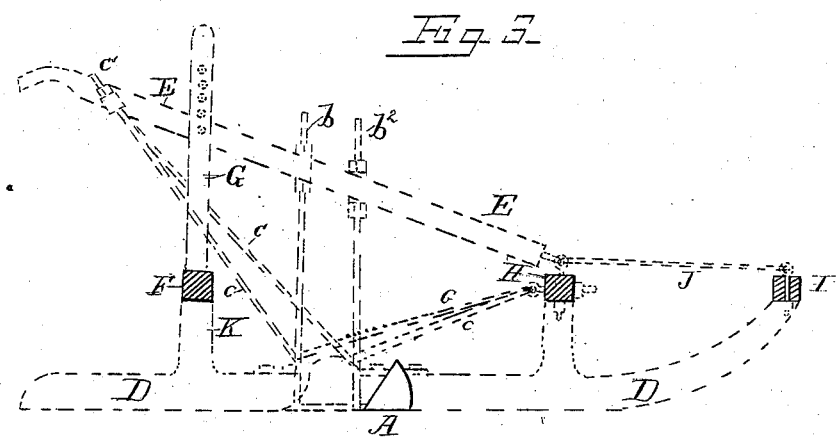
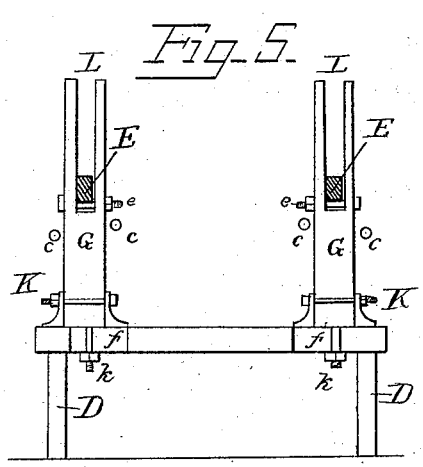
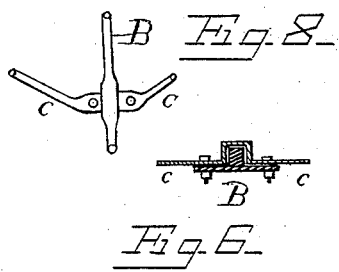
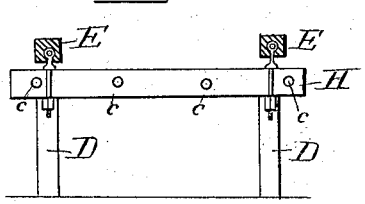
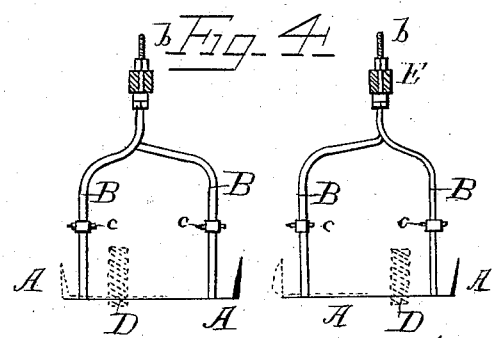
Witnesses
C. W. Brown,
W. E. McGill Jr.
Inventor
W. C. Thompson
By I. H. MacDonald
Asso. Atty.

UNITED STATES PATENT OFFICE

WASHINGTON C. THOMPSON, OF COVINGTON, KENTUCKY.

COTTON SCRAPER AND CULTIVATOR.

SPECIFICATION forming part of Letters Patent No. 290,814, dated December 25, 1883.

Application filed June 2, 1882. (No model.)

*To all whom it may concern:*

Be it known that I, WASHINGTON C. THOMPSON, a citizen of the United States of America, residing at Covington, in the county of Kenton and State of Kentucky, have invented certain new and useful Improvements in Cotton Scrapers and Cultivators, of which the following is a specification, reference being had therein to the accompanying drawings.

My device relates to cotton scrapers and cultivators; and it consists in certain details of construction and arrangement of the several parts, as illustrated in the accompanying drawings, fully set forth in the specification, and particularly pointed out in the claims.

In the drawings, Figure 1 is a plan view of my device; Fig. 2, a side elevation of same; Fig. 3, a section on line 1 2, Fig. 1; Fig. 4, a section on line 3 4, Fig. 1; Fig. 5, a section on line 5 6, Fig. 1; Fig. 6, a section on line 7 8, (all of Fig. 1;) Fig. 7, a detail view of the knife; and Fig. 8 a detail view illustrating the method of fastening the horizontal brace C to the vertical brace B.

Referring more particularly to the drawings, A represents a knife made of steel, and preferably of the form shown at $x$, Fig. 7, the ends being turned up, and of a length to suit the distance apart it is desired to leave the cotton-plant, sugar-cane, or other plant, and so that the plants may be cultivated both ways. The knife may be, however, without the upturned ends. There are two of these knives—one on each side of the machine, and fastened to vertical braces B, and each one vertically adjustable, so as to cut the weeds, cotton, &c., at the proper distance from the ground. They are also adjustable, so that the knives may have the proper angle of inclination to the ground, as shown in dotted lines, Fig. 7. There are four of these braces B—two on each side—the upper ends being screw-threaded and passing through the handles E, and adjusted by means of the nuts $b$ $b'$ on one side and $b$ $b^2$ on the other side. These braces will adjust the knives to the desired distance vertically, and they may be made so as to tilt or incline one knife higher or lower on one side than the other. There are also two longitudinal braces, C, on each side, their upper ends passing through the handles or lugs thereon, and screw-threaded to receive the nuts C' C', the forward ends being secured to eyebolts passing through the bench H. The braces B C are joined together at $z$, as shown in Figs. 2 and 8. The runners D are made sled-shaped, so as to glide over the ridges with greater ease and regularity, and are preferably made in two sections, united by a flexible connection, as shown in Fig. 2. The handles E are pivotally attached at their forward ends to eyebolts in bench H, so as to allow for the unequal movement of the runner-sections, and the handles govern the adjustability of the braces B C, for, as before described, the upper ends of the horizontal braces C are adjustably secured to the handles, and are attached to the braces B at $z$. Again, the handles move up and down in the slots L of standards G, (see Fig. 5,) and are held in any desired position by the pins $e$, which pass through slots or holes in the uprights or standards G. These uprights have a horizontal movement in the slot $f$ of bench F, the lower ends entering an iron shoe, K, on bench F. By this compound adjusting movement of the knives the distance between them can be adjusted to suit the requirements of the ground and plants, and so that they will not only cut the weeds, cotton, &c., but "side up" the "stand" at one and the same operation.

An angular pulley-brace, J, is secured in the forward bench, I, by means of which the horses can drag the machine and yet not tread on the growing crop.

Having thus described my invention, what I claim as new, and desire to secure by Letters Patent, is—

1. A cotton-cultivator provided with braces C C', adjustably secured to the handles at their rear ends, and pivotally attached to the forward part of the cultivator, in combination with the braces B, secured to the cutting-knives and the handles of the cultivator, substantially as shown and described, and for the purpose set forth.

2. In a cotton-cultivator, the slotted uprights G, adjusted to move horizontally in a slot in the bench F, in combination with the handle moving in said uprights, and the adjustable braces C C', secured to the handles and the forward end of the machine, and having the adjustable knives or scrapers secured to said braces, substantially as shown and described, and for the purpose set forth.

3. In a cotton cultivator and scraper, the combination of the runners D, the adjustable handles E, braces B C C', and knives A, substantially as shown and described.

In testimony whereof I affix my signature in presence of two witnesses.

WASHINGTON C. THOMPSON.

Witnesses:
WINFIELD S. MARTIN,
GEORGE O'NEAL.